United States Patent Office 2,959,559
Patented Nov. 8, 1960

2,959,559

PROCESS FOR THE PRODUCTION OF UNSATURATED POLYESTER RESINS WHICH CURE IN THE PRESENCE OF AIR WITH TACK-FREE SURFACES AND RESULTING PRODUCT

Hermann Delius, Hamburg-Lokstedt, Germany, assignor to Reichhold Chemicals, Inc., Detroit, Mich.

No Drawing. Filed Apr. 26, 1957, Ser. No. 655,181

11 Claims. (Cl. 260—22)

The invention relates to a process for the production of unsaturated polyester resins which cure in the presence of air with tack-free surfaces and to the resulting product.

In polymerization and copolymerization reactions, which are caused by radical-forming organic compounds, it is a known fact that the presence of atmospheric oxygen has a disturbing influence, since the polymerizates or copolymerizates remain tacky at least on the surface, due to the chain-breaking action of the air-oxygen molecules. The same applies also for the so-called unsaturated polyester resins, which represent mixtures or solutions of an unsaturated polyester in an unsaturated, monomeric polymerizable compound. In the copolymerization, caused by radical-forming catalysts, the unsaturated polyester resins, due to cross-linking, form solid, insoluble and infusible plastics. The polymerization process is also called hardening.

It is known that tack-free hardening of these unsaturated polyester resins can be obtained by eliminating the access of air during their curing. This can be done in the production of plastics, e.g. by covering with a cellophane foil those parts which are not covered by mold walls. With very thin lacquer-like coatings it is possible to add to the unsaturated polyesters small amounts of materials, which, through the formation of a very thin film on the area exposed to free air, prevent or inhibit the access of air-oxygen molecules, so that the hardening is not disturbed. Both methods have their disadvantages. The covering with cellophane foils is impossible on large or complicated surfaces. As a film-forming additive, a very small amount of paraffin serves, which, even if measured with utmost accuracy, represents a material which is disturbing to the film homogeneity. Hence, the aim to be reached is to produce an unsaturated polyester, which, as a consequence of its chemical structure, possesses the ability of such polymerization and hardening that tack-free surfaces are obtained without any mechanical actions or without heterogeneous additions under free air access.

Our investigations show that, under air drying, mixtures of unsaturated polyesters with unsaturated polymerizable monomer compounds are obtained, if into the molecule of the basic ester a certain proportion of a partially epoxidized unsaturated oil is incorporated.

Unsaturated polyesters within the meaning of this invention are those, which, in a known manner, are made by esterification with glycols, by using α,β-unsaturated dicarboxylic acids, such as fumaric acid, maleic acid or its anhydride and other dicarboxylic acids, if desired, in a mixture of saturated dicarboxylic acids, such as succinic acid, adipic acid, sebacic acid and/or aromatic or hydroaromatic dicarboxylic acids, for instance phthalic acid or hexahydro phthalic acid. As illustrative examples for the great class of the glycols are mentioned only, by way of example, ethylene glycol, di- and triethylene glycol, 1,2 and 1,3-propandiol, 1,3 and 1,4-butandiol.

As raw materials for the partially epoxidized oils which, according to this invention, are to be incorporated, there may be used such oils, of which the fatty acid constituents have an average of approximately two or more double bonds in the molecule. As examples are mentioned: soybean oil, hempseed oil, castor oil, linseed oil, perilla oil, wood oil and others. As substitutes for the natural oils, in whole or in part there may be employed synthetic oils, which are obtained by esterification of unsaturated fatty acids, and tall oil fatty acid, with natural or synthetic di-, tri- and polyfunctional alcohols of different kinds.

Of particular importance is the use of partially epoxidized unsaturated oils, i.e., the partially epoxidized unsaturated oils suitable to be incorporated should show an iodine number of about 100 to 150 after the epoxidation. The epoxidation of the suitable oils may be effected in a known manner, for instance, by using high-strength hydrogen peroxide and formic acid.

The production of polyesters modified by the incorporation of partially epoxidized unsaturated oils, can be effected in such a manner that all components, unsaturated and saturated dicarboxylic acids, glycols and partially epoxidized oils are brought to reaction jointly in a melting process at temperatures between 180 to 200° C., until the desired acid number and viscosity is obtained. An epoxy group fulfills substantially the function of a glycol molecule. In order to survey better the reaction, it is advisable, first to let the components of the actual unsaturated polyester react with each other in the usual way, until the theoretical acid number is approximately obtained, and only subsequently to add the desired part of a partially epoxidized unsaturated oil and to finish the reaction. In this way the hydroxyl groups of the glycols are practically completely esterified before the still existing free carboxyl groups react with the epoxy groups of the partially epoxidized oil. Under the second working process, the danger of a premature gelation of the unsaturated polyester on account of the cross linking effect of a partially epoxidized unsaturated oil is excluded to a great degree, because, normally, a partially epoxidized unsaturated vegetable oil contains, for instance, more than one, and preferably two to three epoxy groups in the triglyceride-molecule, so that a cross-linking and unwanted increase of viscosity or gelation is very possible if the work is done carelessly and particularly under the first described process.

Another advantage of the second process is that the unsaturated dicarboxylic acids, particularly maleic acid or maleic anhydride come into contact with the still remaining double bonds of the partially epoxidized unsaturated oils only after the esterification is very advanced and only during a relatively short period at 180–200° C. This practically excludes the possibility that maleic acid anhydride or maleic acid residues are consumed by reaction with the double bonds of the unsaturated fatty acids and prevents incompatibility developing when the product is later copolymerized with an unsaturated polymerizable compound such as styrene.

In order to eliminate as much as possible the danger of gelation, it might be advisable to reduce the total functionality of the components of an unsaturated polyester in the meaning of the present invention. This can be achieved, on the one hand, through incorporation of saturated or, preferably, of unsaturated higher alcohols with 10 or more C-atoms. Furthermore, the incorporation of mono-carboxylic acids, which may be of a very different nature, is possible, for instance, p. tert. butylbenzoic acid and modified natural resin acids have given excellent results. The latter ones should be modified, for instance partially hydrogenated, in order to eliminate the tendency for forming maleic acid-adducts. As a general rule the compatibility and homogeneity of the partially epoxidized oil and the polyester are improved by the addition of the mono-functional alcohols or acids.

The esterification of the components of a polyester in the meaning of the present invention is carried out in the usual manner with inert gas being bubbled through the batch. After termination of the reaction, the unsaturated polyester, modified by partially epoxidized unsaturated oils, is reacted in a known manner, with a small amount of a suitable inhibitor, such as hydroquinone or tertiary butylcatechol and dissolved in the desired amount of a monomeric polymerizable cross linking compound, such as styrene, in order to prevent a premature copolymerization.

An unsaturated polyester mixture, produced according to the above explanations, after addition of radical-forming polymerization catalysts, such as organic hydroperoxides or peroxides and inhibitors, such as cobalt naphthenate or dimethyl aniline, leads to copolymerizates, which, in thick or thin films, under free air access, have an absolutely tack-free surface. If suitable catalysts are chosen, the copolymerization can also be effected at room temperature.

The invention will be more readily understood by reference to the accompanying examples, which are intended as illustrative of the invention rather than as limiting the invention to the particular details set forth.

*Example 1*

(a) 860 grams refined linseed oil (iodine number =180, corresponds to about 6, 1 double bond per 1 mol oil) are epoxidized in the usual manner, under constant stirring, by gradually adding 194.5 grams of 35% hydrogen peroxide(2 mols $H_2O_2$) and 28,2 grams of 98% formic acid. The reaction mixture is maintained at a temperature of 30° to 35° C. for 24 hours. After separation of the aqueous (watery) phase, the reaction product is washed with water, aqueous sodium bicarbonate and again with water, and subsequently dehydrated by heating in a vacuum. The principal characteristics of the epoxidized oil, which resulted with a yield of 875 grams, are the following:

Oxirane-oxygen content 2.6% (instead of theoretically 3.6%)
Iodine number=134.

(b) 264 grams maleic anhydride, 420 grams phthalic anhydride and 345 grams 1,2-propandiol are carefully melted and heated up to 180° C. under steady stirring, carbon dioxide being bubbled through the batch. After approximately 90 minutes the temperature is increased to 205° C. and maintained until an acid number of 110 to 120 is reached. After the ester has been cooled to 180° C., 685 grams of the above described partially epoxidized linseed oil are added and the reaction mixture, which is inhomogeneous at the beginning, is again heated up to 180° C. After a short while, the mixture becomes clear. If the sample, dissolved in a ratio of 65 parts polyester to 35 parts monomeric styrene, has a viscosity of 0 (Gardner-Holdt) and an acid number of less than 30, the resin is cooled to 100° C. and, after the addition of 300 milligrams hydroquinone, is dissolved in a ratio of 65 parts unsaturated polyester to 35 parts monomer styrene.

(c) 100 grams of unsaturated polyester mixture, as mentioned under (b), consisting of 65% polyester and 35% styrene, 3 grams of a 10% cobalt naphthenate solution in styrene and 10 grams styrene are mixed well. Shortly before spraying, 7.5 grams of a 40% solution of methylethyl ketone hydroperoxide or 6 grams of a 50% solution of cyclohexanone hydroperoxide, for instance in dimethyl phthalate and enough acetate (about 3 to 5%) are added to the mixture, so that a lacquer with a viscosity of 22-23 DIN-sec. results. The film dries dust-free at room temperature in the presence of air in about 5 hours. The surface becomes uneven because of the shrinkage due to the polymerization; however, after 24 hours the thoroughly polymerized film can be made highly glossy by grinding and polishing.

*Example 2*

350 grams 1,2-propanediol, 315 grams phthalic anhydride, 264 grams maleic anhydride, and 252 grams p-tert. butylbenzoic acid are carefully melted and with constant stirring and carbon dioxide bubbling through the batch are heated to 180° C. The melted mass is kept for 90 minutes at this temperature. The temperature is increased to 205° C. and maintained at this temperature until an acid number of 100 to 110 is reached. After cooling to 140° C., 685 grams partially epoxidized linseed oil (as described in Example 1a) are added and again heated to 180° C. The reaction mixture, which is cloudy at the start, is maintained at 180° C., until a sample taken at room temperature is homogeneous. Then, the temperature is dropped to 150° C. and maintained, until 65 parts ester, dissolved in 35 parts styrene, reach a viscosity (Gardner-Holdt) of P–Q, and the acid number of the solution has dropped to 20 to 25. Now, the polyester is cooled to 100° C., and 0.3 gram hydroquinone is added and the polyester is thinned to 65% polyester content in monomeric styrene. A lacquer obtained from this polyester mixture, which is prepared according to Example 1c, air dries with tack-free surface.

*Example 3*

350 grams 1,2-propanediol, 356 grams phthalic anhydride, 270 grams maleic anhydride, and 250 grams of hydrogenated rosin, with the following characteristics: acid number 16.2, iodine number 135 (Wijs), melting point 76° C. (mercury drop method), which is sold commercially under the trade name "Staybelite," are esterified together, as described in Examples 1 and 2, until the ester has reached an acid number of 90 to 100. After cooling to 140° C., 685 grams partially epoxidized linseed oil (as described in Example 1a) are added; the rest of the reaction is conducted as described in Example 2. Characteristics of the finished polyester are:

Viscosity of the 65% solution in styrene (Gardner-Holdt)=T,
Acid number of this solution—25.

A mixture, prepared as described in Example 1c but without addition of acetone, polymerizes in the presence of air into a mass with absolutely tack-free surface.

*Example 4*

350 grams 1,2-propanediol, 420 grams phthalic anhydride, 264 grams maleic anhydride, and 40 grams of an unsaturated $C_{16}$–$C_{18}$ fatty alcohol (iodine number 80 to 85, OH-number=108), are esterified, as described in Examples 1 and 2, until the polyester has reached an acid number of 95 to 105. After cooling to 140° C., 645 grams partially epoxidized linseed oil are added and the rest of the process is carried out as in Example 2.

Characteristics of the finished polyester are:

Viscosity of the 65% solution in styrene (Gardner-Holdt)=T,
Acid number of this solution—24.

This mixture, as descirbed in Example 1c but prepared without the addition of acetone, hardens also in the presence of air with absolutely tack-free surface.

*Example 5*

(a) 355 grams of a fish oil, refined in the "Solexol" process (iodine number 210, viscosity 192), are reacted in a known manner with 106 grams of a 35% hydrogen peroxide solution and 15.6 grams of 98% formic acid. The reaction mixture is maintained for 48 hours with constant stirring, at 40 to 45° C., and subsequently processed (as described in Example 1a). 365 grams of a partially epoxidized fish oil which has an iodine number of 135 and a content of oxiran oxygen of 3.3% are obtained.

(b) 350 grams propanediol-1,2, 380 grams phthalic anhydride, 198.5 grams maleic anhydride, and 96 grams p.-tert.-butylbenzoic acid are carefully melted and heated to 180° C. with inert gas bubbling through the batch and with constant stirring, and maintained at this temperature for 90 minutes. Then, the temperature is increased to 205° C. and maintained until the acid polyester has reached an acid number of about 40. After cooling to 140° C., 322 grams of the above-described partially epoxidized fish oil are added and the further process is carried out according to Example 2. The solution of the finished product with a 65% solids content in styrene had a viscosity (Gardner-Holdt)=T and an acid number of 19.5.

Such a mixture, prepared according to Example 1c, represents a lacquer, which dries in the presence of air to a tack-free surface. Without the addition of acetone, the same mixture is suitable as a molding resin, which in the presence of atmospheric oxygen gives masses with tack-free surface.

The invention has been described in detail for the purpose of illustration but it will be obvious that numerous modifications and variations within the scope of the accompanying claims may be resorted to without departing from the invention.

I claim:

1. A process for producing an unsaturated mixed polyester resinous composition which will cure in the presence of air with a tack-free surface, which process comprises (a) 1,2-epoxidizing at least one unsaturated oil until it has reached an oxirane content between 1 and 4 percent and an iodine number between 150 and 100, (b) esterifying an amount of 20 to 90 mol percent of at least one alpha beta unsaturated dicarboxylic acid and an amount of 80 to 10 mol percent of a saturated dicarboxylic acid with such an amount of an aliphatic saturated dihydric alcohol at temperatures between 170° and 220° centigrade that the resulting polyesters have acid numbers between 40 and 120, (c) reacting the intermediate products obtained by the steps (a) and (b), in such molar ratios that a product having an acid number not higher than 30 is attained, and blending said product with a polymerizable vinyl monomer.

2. A process for the production of unsaturated mixed polyester resins according to claim 1, in which a member of a group consisting of monoalcohols and monocarboxylic acids in an amount of less than 20 mol percent is added during step (b).

3. The product produced in accordance with the process of claim 1.

4. The product produced in accordance with the process of claim 2.

5. The solution of the product produced according to the process of claim 1, in from 10 to 60 percent by weight of a monomeric polymerizable vinyl compound.

6. A process of producing a tack-free film which comprises air drying the polymerizable mixture of claim 5 at room temperature with the aid of a peroxide polymerization catalyst.

7. A process of producing a tack-free film which comprises air drying the polymerizable mixture of claim 5 at room temperature with the aid of a peroxide polymerization initiator and with the aid of a promoter selected from a group consisting of heavy metal salts of fatty acids.

8. A composition of matter which will cure in the presence of air with a tack free surface comprising a blend of (1) an unsaturated polymerizable alkyd resin of the following ingredients: (a) an epoxidized oil of an iodine number between 100 and 150 having 1,2-epoxy groups and containing between 1 and 4% of oxirane oxygen, (b) an alpha-beta unsaturated dicarboxylic acid, (c) a dicarboxylic acid having no unsaturation other than benzenoid, (d) a saturated aliphatic dihydric alcohol, and (2) a cross linking agent comprising a polymerizable vinyl monomer.

9. A composition as set forth in claim 8, wherein the ingredient (c) is partly replaced with a monocarboxylic acid, and (d) is partly replaced with a monohydric alcohol.

10. A composition of matter comprising a blend of (1) an unsaturated polymerizable alkyd resin of the following ingredients: (a) an epoxidized oil of an iodine number between 100 and 150 having 1,2-epoxy groups and containing between 1 and 4% of oxirane oxygen, (b) an alpha-beta unsaturated dicarboxylic acid, (c) a dicarboxylic acid having no unsaturation other than benzenoid, (d) a saturated aliphatic dihydric alcohol, and (2) a polymerizable vinyl monomer, wherein the ingredients of the alkyd resin are (a) epoxidized linseed oil containing about 2–3% oxirane oxygen, (b) maleic acid, (c) phthalic acid, (d) propylene glycol-1,2; and wherein (2) is styrene.

11. A tack-free film made of composition of claim 8 by adding a peroxide catalyst and air-drying at room temperature.

References Cited in the file of this patent

UNITED STATES PATENTS

| | | |
|---|---|---|
| 2,407,479 | D'Alelio | Sept. 10, 1946 |
| 2,720,500 | Cody | Oct. 11, 1955 |
| 2,785,883 | Foster | Mar. 12, 1957 |